United States Patent [19]
Elliott

[11] Patent Number: 5,762,129
[45] Date of Patent: Jun. 9, 1998

[54] PORTABLE LIQUID COOLING AND HEATING APPARATUS

[76] Inventor: Frank S. Elliott, 1208 E. Christy Dr., Phoenix, Ariz. 85020

[21] Appl. No.: 690,860

[22] Filed: Aug. 1, 1996

[51] Int. Cl.[6] .............................. F25B 29/00; F24F 1/02
[52] U.S. Cl. .................. 165/48.1; 62/420; 62/460; 62/461; 62/236; 62/239
[58] Field of Search .................. 165/48.1; 62/420, 62/461, 460, 239, 236

[56] References Cited

U.S. PATENT DOCUMENTS

| | | | |
|---|---|---|---|
| 665,389 | 1/1901 | Bosmann | 62/460 |
| 1,046,727 | 12/1912 | Blenz et al. | 62/420 |
| 2,198,822 | 4/1940 | Karge | 62/461 |
| 3,224,218 | 12/1965 | New | 62/239 |
| 4,027,727 | 6/1977 | Pullens | 62/236 |
| 4,129,994 | 12/1978 | Ku | 62/236 |
| 4,841,742 | 6/1989 | Biby | 62/420 |

FOREIGN PATENT DOCUMENTS

| | | | |
|---|---|---|---|
| 337173 | 11/1903 | France | 62/420 |
| 0195724 | 11/1983 | Japan | 62/420 |

*Primary Examiner*—John K. Ford
*Attorney, Agent, or Firm*—H. Gordon Shields

[57] ABSTRACT

A portable housing holds a quantity of ice and the melt water from the ice or cooled water or cooled liquid is circulated through a heat exchanger. A blower circulates air from the room through the heat exchanger and back into the room for cooling the room. The housing includes a relatively large chamber for holding the ice and a relatively smaller chamber in which the blower is disposed. Melt water from the ice, or cooled water or cooled liquid, is pumped through the heat exchanger and from the heat exchanger the liquid flows by gravity back to the ice and water chamber. An alternate embodiment is disclosed in which there is a closed loop liquid heat exchange system by which a coil is disposed beneath the ice and is cooled. A pump continuously circulates the liquid in the closed loop, with the heat exchanger through which air is blown is part of the closed loop system. The apparatus may also be used as a portable heater by using hot water instead of cold water in the heat exchanger.

15 Claims, 3 Drawing Sheets

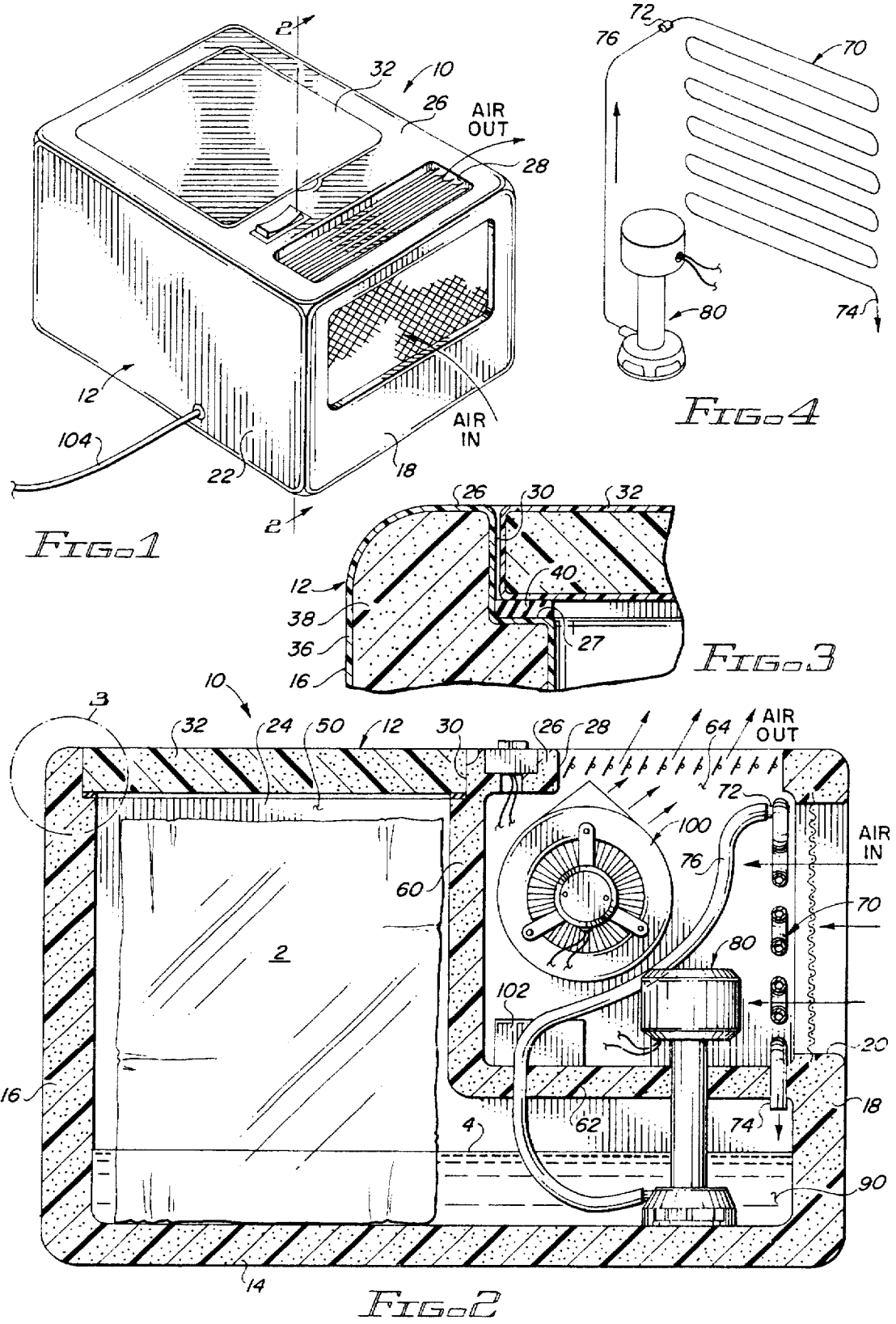

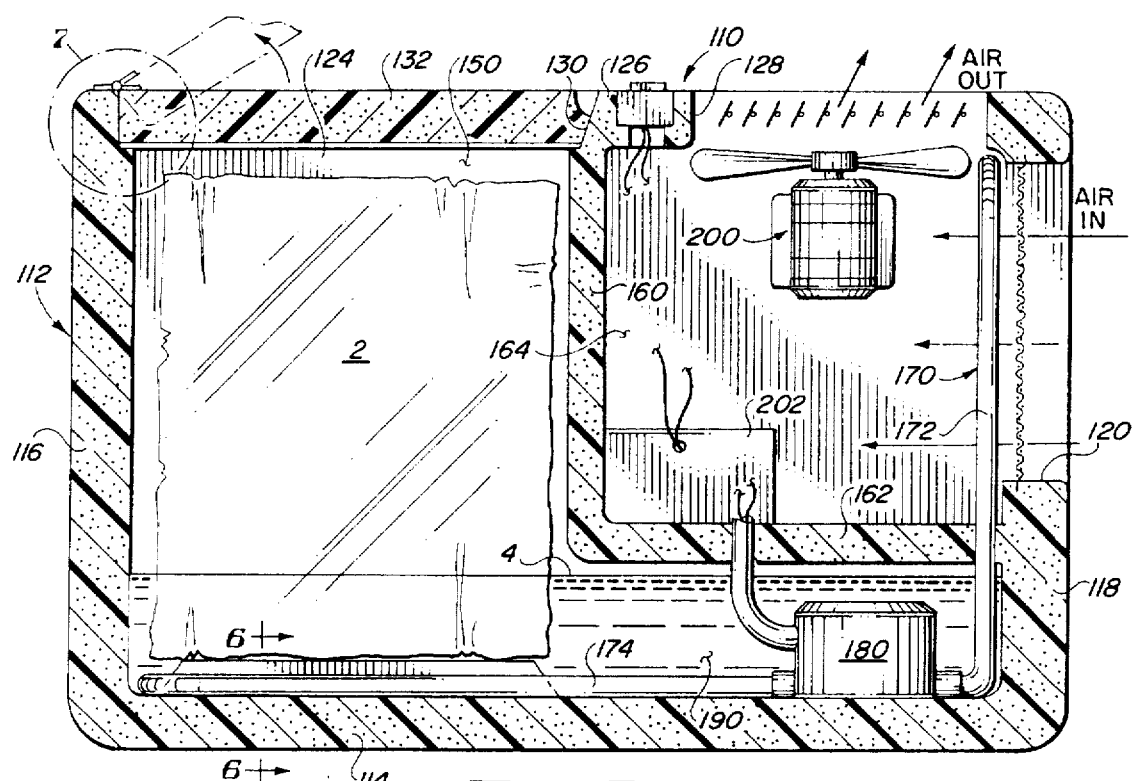
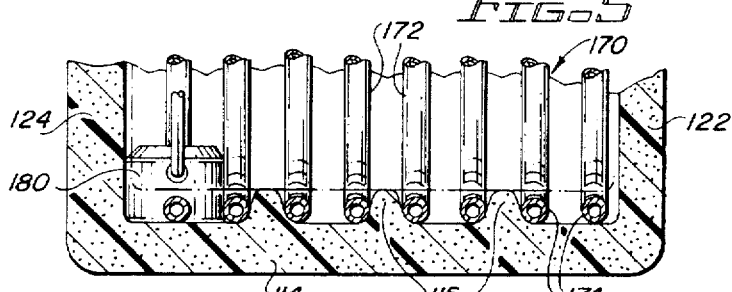
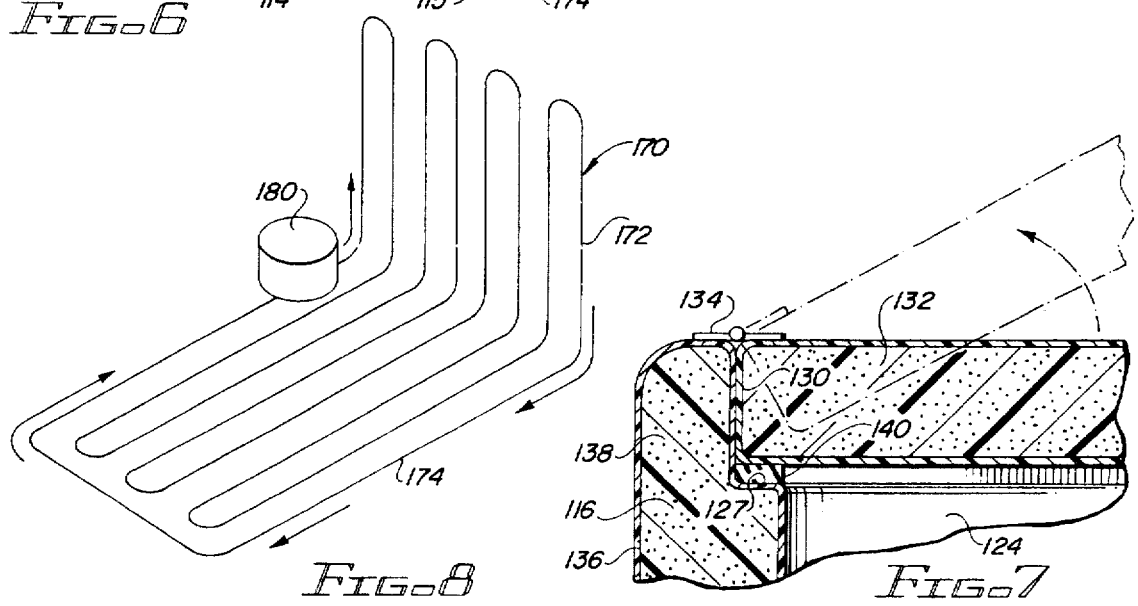

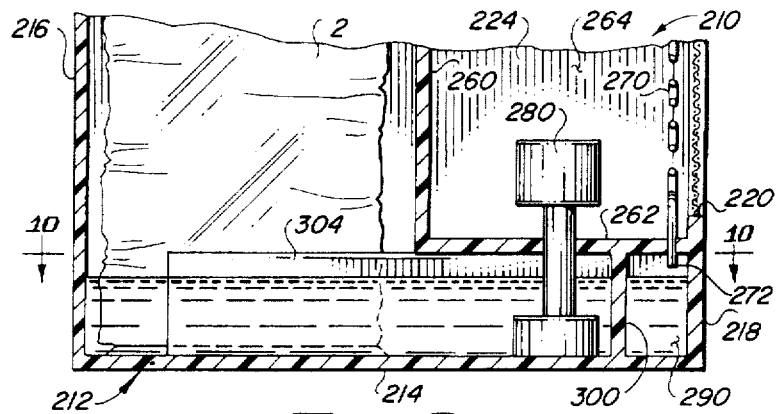
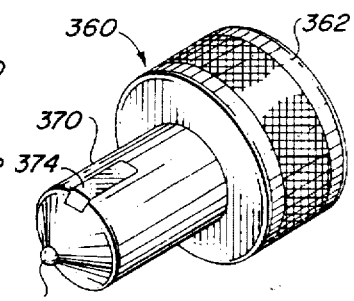
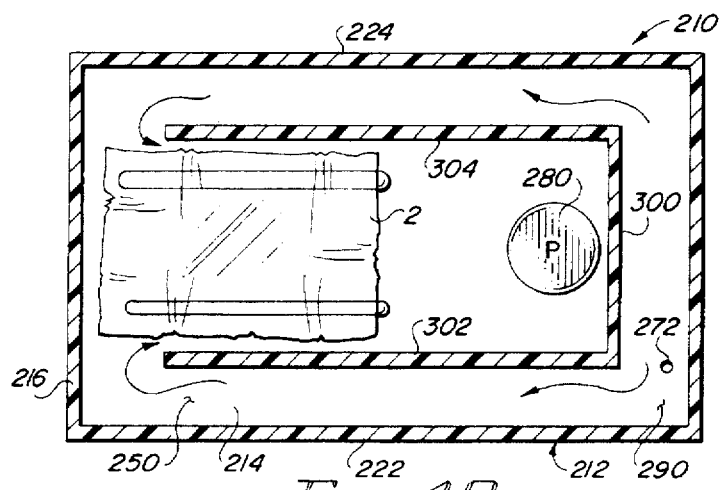
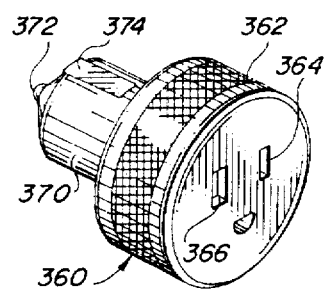
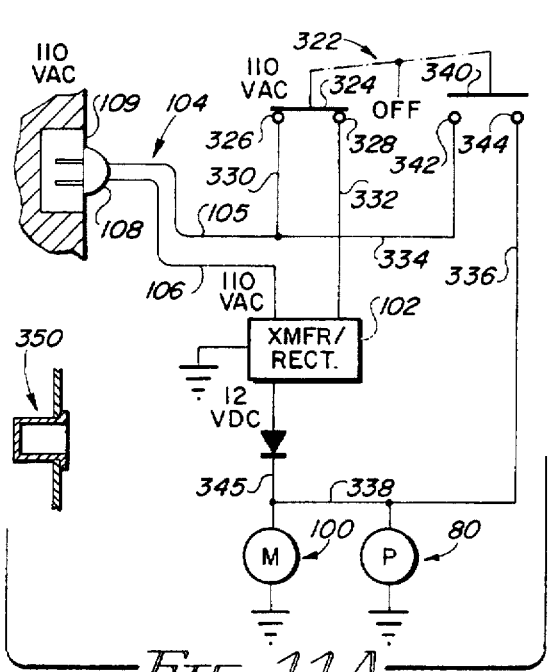
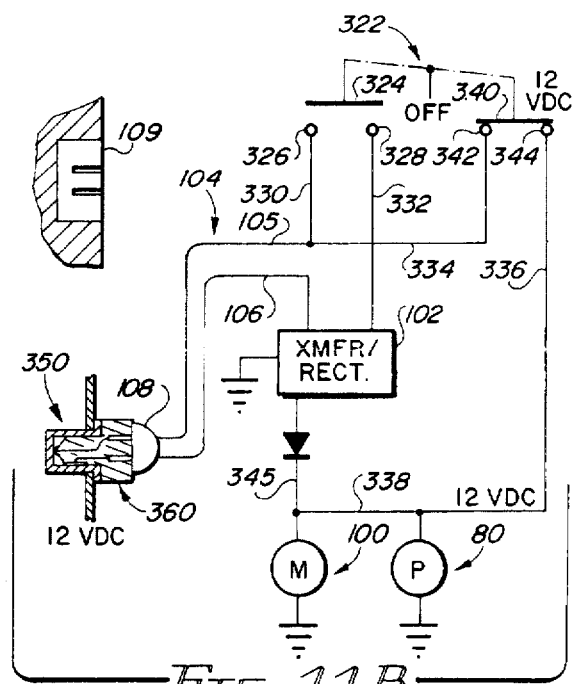

1

PORTABLE LIQUID COOLING AND HEATING APPARATUS

BACKGROUND OF THE INVENTION

1. Field of the Invention

This invention relates to portable apparatus for cooling and heating air in a room or the like and, more particularly, to the cooling of air by using ice, ice water, or water for cooling and hot water for heating through a heat exchanger, and using water or other liquid for the heat exchange medium.

2. Description of the Prior Art

There are essentially two types of systems for cooling air, the simplest is an evaporative air cooler where pads are soaked with water and a blower is used to blow air through the soaked pads. The air is evaporatively cooled as it moves through the soaked pads and is then blown into a room, a building, etc. This type of evaporative air cooling system functions relatively well in situations of relatively low humidity. As the humidity rises, efficiency of evaporated air cooling systems decreases.

The second general system of cooling air is a refrigeration system in which air is blown past evaporator coils through which a refrigerant flows.

An alternate system of the latter is the use of a refrigerant to cool water, and the chilled water is passed through coils and air is blown past the coils and heat is exchanged. The cooled air is then circulated through a building, room, etc.

SUMMARY OF THE INVENTION

The invention described and claimed herein includes a relatively small, portable housing in which is disposed a quantity of ice or cooled water or cooled liquid. Within the housing is a separate chamber in which a blower is disposed. A heat exchanger is disposed in the blower chamber at an opening of the housing. A pump is used to pump water from the melting ice or cooled water or cooled liquid through the heat exchanger, and a blower is used to pull air through the heat exchanger. The cooled air is blown into the room in which the apparatus is disposed. The use of hot water instead of cold water allows the apparatus to be used as a portable heater.

Among the objects of the present invention are the following:

To provide new and useful apparatus for cooling a room;

To provide new and useful apparatus for cooling a room using ice and its melt water as a cooling medium;

To provide new and useful portable apparatus for using alternatively a cooling medium or a heating medium circulating through a heat exchanger for cooling or heating a room;

To provide new and useful portable apparatus for heating and cooling using a heat exchange medium and a pump and a blower powered selectively by alternating or direct current;

To provide new and useful portable apparatus for holding a quantity of ice and its melt water and for circulating the melt water through a head exchanger and a blower for circulating air through the heat exchanger and into a room in which the apparatus is disposed; and To provide new and useful apparatus utilizing ice and its melt water or cooled water or cooled liquid as a cooling medium for cooling a room.

BRIEF DESCRIPTION OF THE DRAWING

FIG. 1 is a perspective view of the apparatus of the present invention.

FIG. 2 is a view in partial section taken generally along line 2—2 of FIG. 1.

FIG. 3 is an enlarged view in partial section taken generally from circle 3 of FIG. 2.

FIG. 4 is a schematic representation of a portion of the apparatus of the present invention.

FIG. 5 is a view in partial section through an alternate embodiment of the apparatus of the present invention.

FIG. 6 is a view in partial section taken generally along line 6—6 of FIG. 5.

FIG. 7 is an enlarged view in partial section taken generally from circle 7 of FIG. 5.

FIG. 8 is a schematic representation of a portion of the apparatus of FIG. 5.

FIG. 9 is a side view in partial section of a portion of an alternate embodiment of the apparatus of the present invention.

FIG. 10 is a view in partial section taken generally along line 10—10 of FIG. 9.

FIG. 11A is a schematic representation of one mode of electrical circuitry associated with the apparatus of the present invention.

FIG. 11B is a schematic representation of a second mode of electrical circuitry associated with the apparatus of the present invention.

FIG. 12 is a perspective view of a portion of the apparatus of FIG. 10.

FIG. 13 is another perspective view of the apparatus of FIG. 12.

DESCRIPTION OF THE PREFERRED EMBODIMENT

FIG. 1 is a perspective view of cooler apparatus 10 of the present invention. FIG. 2 is a view in partial section of the apparatus 10 taken generally along line 2—2 of FIG. 1. For the following discussion, reference will primarily be made to FIGS. 1 and 2.

Cooler apparatus 10 includes a housing 12 which is generally of a rectangular configuration. The housing 12 includes a bottom 14, an rear end 16, and a front end 18. The front end 18 includes a screened opening 20 extending therethrough. The ends 16 and 18 extend upwardly from the bottom 14, and are joined by a pair of sides 22 and 24.

The housing 12 also includes a top 26. At the front end of the top 26, adjacent to the front end 18, there is a louvered opening 28. Rearwardly of the louvered opening 28, there is an opening 30 which extends through the top 26. The opening 30 is closed by a lid 32.

Construction of the housing 12 is generally illustrated in FIG. 3, which comprises an enlarged view in partial section taken generally from circle 3 of FIG. 2. In FIG. 3, the housing 12 is shown as including an outer skin 36, which may be a plastic, and which encloses an inner insulation layer 38. It will be noted that the lid 32 is also of generally the same construction as is the housing 12.

FIG. 3 also discloses a lip 27 which extends about the opening 30. A gasket 40 is disposed on the lip or shoulder 27. The lid 32 is then disposed on the gasket 40 to close the opening 30.

Returning to FIG. 2, there is shown a rear chamber 50 defined within the housing 12 and generally beneath the lid 32. Within the rear chamber 50 is a block of ice 2.

The front of the rear chamber 50 is defined by a generally vertical wall 60 which extends downwardly from the top 26.

The vertical wall is disposed downwardly roughly two thirds or three fourths of the overall height of the housing 12. From the bottom of the vertical wall 60, there is a horizontal wall 62 which extends forwardly and joins the front end 18. The horizontal wall 62 extends to the front wall 18 beneath the screened opening 20. A components chamber 64 is defined between the side walls 22 and 24, the vertical wall 60, the horizontal wall 62, and the top 62 beneath the louvered opening 28 and the front wall 18 adjacent to the screened opening 20.

Within the components chamber 64 is a blower 100 and a transformer/rectifier 102.

Appropriately secured adjacent to the screened opening 20 is a heat exchanger 70. The heat exchanger 70 includes an input element 72 and an output or drain element 74. A conduit 76 extends from the input 72 to a pump 80. A portion of the pump 80 is disposed beneath the horizontal wall 62, and a portion is disposed within the components chamber 64. Beneath the components chamber 64 is a sump 90. The lower portion of the pump 80 is disposed in the sump 90. The drain 74 of the heat exchanger 70 communicates with the sump 90.

The blower 100 is disposed within the components chamber 64, and the blower pulls air through the screened opening 20, through the heat exchanger 70, and blows it out through the louvered opening 28 and into the room in which the apparatus 12 is disposed.

For providing electrical current to the pump 80 and the blower 100, an electrical cord 104 is shown in FIG. 1. In FIG. 2, the transformer 102 is shown disposed on the horizontal wall 62 within the components chamber 64. The transformer 102 and the electrical cord 104, will be discussed in more detail below, in conjunction with FIGS. 11, 12, and 13.

In FIG. 2, water 4 is shown in the sump 90 and surrounding the bottom portion of the block of ice 2.

FIG. 4 comprises a schematic representation of the circulation of water 4 through the heat exchanger 70. The pump 80 pumps the water 4 upwardly through the conduit 76 and into the heat exchanger 70 through the input 72. The cold water circulates through the heat exchanger 70, and air flowing in through the opening 20 and through the heat exchanger 70 is cooled before being blown out into the room through the louvered opening 28.

FIG. 5 is a view in partial section through an alternate embodiment 110 of the present invention. FIG. 6 is a view in partial section taken generally along line 6—6 of FIG. 5. FIG. 7 is an enlarged view in partial section taken generally from circle 7 of FIG. 5. FIG. 8 is a schematic representation of a portion of the apparatus 110. For the following discussion, reference will primarily be made to FIGS. 5, 6, 7, and 8.

Apparatus 110 in general is very similar to the apparatus 10 described above. Apparatus 110 includes a housing 112, and the housing 112 includes a bottom 114, a pair of end walls 116 and 118, and a pair of side walls 122 and 124. The bottom wall 114, the end walls 116 and 118, and the sides 122 and 124 are all appropriately connected together. The housing 112 is closed by a top 126.

In the front end wall 118 is a screened opening 120. In the top 126 is a louvered opening 128 and a rear opening 130 closed by a lid 132. The lid 132 is pivotally secured to the top 126 by hinge elements 134.

The construction of the housing 112 and the lid 132 is substantially the same as that of the apparatus 10, and this is best shown in FIG. 7. The construction includes an outer skin 136 enclosing a layer of insulation 138.

About the opening 130, extending downwardly from the top 126, is a lip or shoulder 127. A gasket 140 is disposed on the lip or shoulder 127, and the lid 132 is disposed on the gasket 140 when the lid is down and closed.

Beneath the lid 132 is a rear chamber 150. A block of ice 2 is shown in FIG. 5 disposed in the chamber 150. The front of the chamber 150 is defined by a vertically extending wall 160 which extends downwardly from the top 126 and extends between the walls 122 and 124. The wall 160 is disposed downwardly within the housing 112 about two thirds or three fourths of the overall height of the housing 112. From the bottom of the vertical wall 160, a horizontal wall 162 extends forwardly to the front wall 118 beneath the screened opening 120. A components chamber 164 is defined between the vertical wall 160, the front wall 118 adjacent to the screened opening 120, above the wall 162, and between the side walls 122 and 124 and beneath the louvered opening 128 of the top 126.

A heat exchanger 170 is disposed adjacent to the screened front opening 120. The heat exchanger 170 includes two portions, a vertically extending portion 172 and a horizontally disposed portion 174. The vertically extending portion 172 is disposed adjacent to the screened opening 120, and the horizontal portion 174 is disposed on the bottom 114. As best shown in FIG. 6, the bottom 114 includes a plurality of ribs 115, and the horizontal portion 174 is disposed between the ribs 115. The heat exchanger 170 is essentially a closed unit, and a pump 180 is disposed in the heat exchanger 170 to pump a heat exchange medium through the vertical and horizontal portions of the heat exchanger 170.

A sump 190 is defined beneath the components chamber 164, and the pump 180 is shown in FIG. 5 disposed in the sump area. Cold water 4 is shown in the sump portion 190 and extending rearwardly into the rear chamber 150 about the ice 2.

Within the components chamber 164 beneath the louvered opening 128 is a fan 200. The fan 200 includes a motor and fan blades. The motor 200 is electrically connected to a transformer 202, as is the pump 180.

Essentially, as indicated above, the heat exchanger 170 is a closed unit. The vertical and horizontal portions are preferably coils in which flows, by virtue of the pump 180, an appropriate liquid heat exchange medium, such as an ethylene glycol based liquid, or the like.

The heat exchanger 170 includes two portions, a vertical portion 172 and a horizontal portion 174. Liquid flows in the two portions in response to the pump 180. The liquid medium flows from the vertical portion 172 into the horizontal portion 174 and exchanges heat to the cold water and ice, etc., in the sump 190 and in the rear chamber 150, and the cooled medium is then pumped through the vertical portion or coils 172. The fan 200 causes air to flow in through the screened opening 120, past the vertical portion of the heat exchanger 172, where the air is cooled. The fan then blows the cooled air out of the apparatus 110 through the louvered opening 128 in the top 126.

The circulation of the fluid medium by the pump 180 through the heat exchanger 170 is best illustrated in FIG. 8. FIG. 8 schematically illustrates the flow of the medium through the coils of the two portions 172 and 174 for heat exchange purposes.

FIG. 9 is a side view in partial section of another alternate embodiment of the apparatus of the present invention, namely apparatus 210.

FIG. 10 is a view in partial section taken generally along line 10—10 of FIG. 9. FIG. 9 comprises a side view of the lower portion of a housing 212 of the apparatus 210, and FIG. 10 is a plan view of the lower portion of the housing 212. For the following discussion, reference will primarily be made to FIGS. 9 and 10. The primary difference between the apparatus 210 and the apparatus 10 of FIGS. 1–4 lies in the use of a baffle to direct the return fluid from a sump 290 beneath a heat exchanger 270 rearwardly, to the rear of a rear chamber 250 in which is disposed a block of ice 2.

The housing 212 is in other respects generally the same as the housing 12 shown in FIGS. 1, 2, and 3. The housing 212 includes a bottom 214, a rear wall 216, a front wall 218 in which there is a screened opening 220, and a pair of side walls 222 and 224.

Within the housing 212 is a downwardly extending vertical wall 260 and a horizontal wall 262 which, with the side walls 222 and 224 and the front wall 218, define a components chamber 264. A heat exchanger 270 is disposed within the components chamber 264 adjacent to the screen of opening 220. A pump 280 extends upwardly into the components chamber 264 from beneath the horizontal wall 262. A blower or fan, not shown, is also disposed within the components chamber 264. The blower or fan has been omitted for purposes of clarity.

Water from the heat exchanger 270 drains into the sump 290 from a drain 272. The sump is disposed between a front baffle wall 300 and the bottom portion of the front wall 218 and beneath the horizontal wall 262. The front baffle wall 300 extends downwardly from the horizontal wall 262 to the bottom 214. The water then flows from the sump 290 rearwardly between the outer wall 222 and a side baffle wall 302 and between the wall 224 and a side baffle wall 304.

The side baffle walls 302 and 304 extend rearwardly from the front baffle wall 300 generally parallel to the respective side walls 222 and 224. The side baffle walls 302 and 304 terminate adjacent to, but spaced apart from, the rear wall 216. The ice 2 is disposed in a rear chamber 250 between the side baffle walls 302 and 304, as best shown in FIG. 9.

The purpose of the baffles 300, 302 and 304 is to provide a relatively long path for the return water from the sump 290 to the pump 280. That is, the return water from the heat exchanger 270 must flow to the rear of the housing 218 and past the block of ice 2 before it returns to the pump 280 for recirculation. In that way, the return water will have cooled a maximum amount prior to being recirculated. Thus, a maximum amount of heat is exchanged in the overall process.

In the embodiment of apparatus 10 and apparatus 210, a block of ice 2 is illustrated as being the cooling medium. Thus, as the ice melts, the ice water is circulated through a heat exchanger and the "warmed" water is then recirculated. As the ice melts, more and more water is provided, and the water remains essentially at 32 degrees Fahrenheit as the ice melts. At some point, of course, the water needs to be drained and the rear chambers need to be refilled with ice for continued cooling.

With the closed circulation system of the apparatus 110, of FIGS. 5 and 6, ice is again illustrated as the cooling element or medium, but the ice and its ice melt or cold water is used to cool a recirculating medium in the closed loop heat exchanger 170.

It is obvious that any appropriate cooling medium or element may be used, as desired. For example, dry ice may be used in conjunction with water, etc., in any of the embodiments.

While ice water may provide more efficient cooling than merely cold water, it is obvious that cold water, as from a tap, a lake or stream, etc., may also be used in many circumstances to provide the desired cooling.

Moreover, while the apparatus of the present invention is described thus far as providing cooled air, it is obvious that the apparatus may also be used to provide warm air in cold situations or environments by using and circulating hot water instead of ice or cold water in the apparatus 10 and 210, and hot water as a source of heat for a closed circulation system such as the apparatus 110.

The apparatus of the present invention is a relatively small, portable apparatus which may be manufactured relatively inexpensively for emergency purposes, camping, etc.

Electrical elements which may be used in the apparatus of the present invention are illustrated in FIGS. 11A, 11A, 12, and 13. FIG. 11A comprises a schematic representation of one mode of the electrical system, and FIG. 11B represents a second mode, which may be used in the apparatus of the present invention. In FIGS. 11A and 11B, both the pump 80 and the blower 100 are illustrated as being 12 volt DC elements. The transformer 102 transforms and rectifies 110 volt alternating current down to the 12 volt DC current required for the pump 80 and the blower 100. In FIG. 11A, electrical cord 104, which includes two conductors, a conductor 105 and a conductor 106, is shown extending to a plug 108, and the plug 108 is connected to a 110 volt AC wall outlet 109. Thus, FIG. 11A illustrates the alternating current mode of the apparatus.

The cord 104 extends to a three position switch 322 which includes a center "off" position and either a 110 volt "on" position or a 12 volt "on" position. The 110 volt alternating current "on" position is shown in FIG. 11A. The 110 volt "on" position includes a switch contact 324 electrically contacting two terminals 326 and 328. A conductor 330 extends between the terminal 326 and the conductors 105 in the electrical cord 104. A conductor 332 extends from the terminal 328 to the transformer and rectifier 102. The other conductor 106 in the electrical cord 104 extends directly to the transformer rectifier 102. The transformer rectifier 102 is appropriately connected to a circuit ground, and a conductor 345 extends from the transformer rectifier 102 to the blower 100, and a conductor 338 extends from the conductor 345 to the pump 80. As indicated above, both the blower 100 and the pump 80 are 12 volt DC elements, and they are appropriately connected to a circuit ground.

FIG. 11B illustrates the 12 volt direct current mode of operation. For operating directly from a 12 volt direct current source, the switch 322 is moved to the 12 volt "on" position. The 12 volt "on" position includes a switch contact 340 which makes electrical contact with a pair of terminals 342 and 344. The terminal 344 is connected to the conductors 330 and 105, and the terminal 344 is connected by a conductor 336 to the conductor 338. It will be noted that there is a diode in conductor 345 between the conductor 338 and the transformer rectifier 102 to prevent current being fed back to the transformer rectifier on the conductor 345 from the conductors 336 and 338 when the switch 322 is in the twelve volt "on" position.

For purposes of connecting directly to 12 volt DC source, such as a cigarette lighter receptacle 350 of a vehicle, the three prong AC plug 108 is shown extending to an adapter 360 which is in turn plugged into the cigarette lighter receptacle 350. FIGS. 12 and 13 illustrate the adapter 360. FIG. 12 comprises a rear perspective view of the adapter 360, while FIG. 13 comprises a front perspective view of the adapter 360. For the following discussion, reference will primarily be made to FIGS. 12 and 13, but reference may also be made to FIG. 11B.

The adapter 360 includes a receptacle portion 362 and a plug portion 370. The receptacle portion 362 is of a general cylindrical configuration and includes three plug openings for receiving the three prongs of the standard three pronged 110 volt plug 108. The openings in the receptacle portion 362 include an opening 364 and an opening 366, and the plug openings include electrical contacts for the plug contacts of the plug 108. The electrical elements or contacts of the plug 108 are accordingly appropriately electrically connected to electrical contacts 372 and 374 in the plug portion 370.

The plug portion 370 is of a generally elongated cylindrical configuration and of an appropriate diameter and length for making the necessary electrical contact with the electrical elements of the cigarette lighter 350. The electrical cord 104 is shown in FIG. 11B with the plug 108 connected to the adapter 360.

Electrical contacts 372 and 374 on the plug portion 370 provide the electrical contact between the plug 108 and the electrical elements associated with a 12 volt DC battery of a vehicle, such as a car, truck, bus, boat, etc, through the receptacle 350. When the plug 108 is connected to the adapter 360, and the adapter is plugged into a vehicle cigarette lighter 350, the apparatus of the present invention is able to operate on a vehicle battery when the switch 322 is moved to the 12 volt "on" position, with the switch contact 340 electrically connecting the terminals 342 and 344. As indicated above, the current from a twelve volt battery then flows from the conductor 105 and the conductor 344, the terminal 342, the switch contact 340, the terminal 344, and the conductors 336 and 338 to the pump 80 and the blower 100.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for cooling a room comprising in combination:
   a housing, including
   a bottom,
   a pair of side walls secured to and extending upwardly from the bottom,
   a rear wall secured to the bottom and to the side walls,
   a front wall secured to the bottom and to the side walls remote from the rear wall,
   an opening in the front wall,
   a top secured to the side walls, the rear wall and the front wall,
   a first opening in the top adjacent to the front wall,
   a second opening in the top adjacent to the rear wall, and a lid closing the second opening in the top;
   a vertical wall extending downwardly between the sides from the top between the first and second openings in the top and terminating above the bottom;
   a horizontal wall extending between the vertical wall and the front wall below the opening in the front wall;
   heat exchanger means for receiving a cooling medium;
   a cooling medium in the heat exchanger;
   means for cooling the cooling medium in the heat exchanger;
   means for pulling air through the opening in the front wall and past the heat exchanger to cool the air and for blowing the cooled air out through the first opening in the top; and
   means for circulating the cooling medium in the heat exchanger means.

2. The apparatus of claim 1 in which the cooling medium comprises cold water.

3. The apparatus of claim 2 in which the means for cooling the cold water cooling medium comprises ice disposed in the housing beneath the lid.

4. The apparatus of claim 3 in which the means for circulating the cooling medium comprises a pump for pumping the cold water through the heat exchanger means.

5. The apparatus of claim 1 in which the heat exchanger means includes a first portion disposed adjacent to the opening in the front wall and a second portion disposed on the bottom.

6. The apparatus of claim 1 in which the housing means further includes
   a first baffle extending downwardly from the horizontal wall,
   a second baffle secured to the first baffle adjacent to one of the side walls and extending rearwardly to adjacent to the rear wall, and
   a third baffle secured to the first baffle adjacent to the other of the side walls and extending rearwardly to adjacent to the rear wall, and a sump is defined between the front wall and the first baffle.

7. The apparatus of claim 6 in which the heat exchanger means includes a drain for draining the cooling medium, and the drain extends to the sump, whereby the cooling medium flows from the heat exchanger rearwardly between the side walls and the respective second and third baffles.

8. The apparatus of claim 7 in which the means for circulating the cooling medium includes a pump disposed adjacent to the first baffle and between the second and third baffles whereby the cooling medium flows from the sump rearwardly past the second and third baffles and then forwardly to the pump for recirculating.

9. The apparatus of claim 1 in which the means for pulling air through the heat exchanger comprises a blower, and the means for circulating the cooling medium comprises a pump, and the apparatus further includes means for providing electrical current to the blower and the pump.

10. The apparatus of claim 9 in which the means for providing electric current to the blower and the pump includes
    switch means for controlling the electric current, including an off position, and a one hundred ten volt "on" portion,
    a transformer and rectifier electrically connected to the one hundred ten volt "on" portion and to the blower and pump, and
    a plug connected to the one hundred ten volt "on" portion and to the transformer and rectifier for connecting to a one hundred ten volt alternating current source.

11. The apparatus of claim 10 in which the switch means further includes a twelve volt "on" portion connected to the blower and to the pump.

12. The apparatus of claim 11 in which the means for providing electrical current to the blower and the pump further includes an adapter for receiving the plug for connecting the plug to a twelve volt direct current source.

13. Portable cooling and heating apparatus comprising in combination:

a housing having a bottom, a front end wall, a rear end wall, a pair of side walls, and a top wall;

a first compartment in the housing;

a first opening in the housing through which air flows into the first compartment;

a second opening in the housing through which air flows out of the first compartment;

a heat exchanger in the first compartment through which air flows;

means for providing the flow of air into the first compartment, through the heat exchanger, and out of the first compartment;

a second compartment in the housing for holding selectively a quantity of heating or cooling medium;

a heat exchange medium flowing in the heat exchanger and responsive to the heating or cooling medium to heat or cool the air flowing through the heat exchanger; the housing further includes a sump disposed beneath the first compartment, and the heat exchanger includes a drain for draining the heat exchanger in the sump, and the sump communicates with the second compartment; and baffle means in the second compartment for providing a relatively long path for the heat exchange medium from the sump to the second compartment.

14. The apparatus of claim 13 which further includes a pump for circulating the heat exchange medium in the heat exchanger.

15. The apparatus of claim 13 in which the first compartment communicates with the front wall and the top wall, and the first opening is in the front wall and the second opening is in the top wall.

* * * * *